United States Patent [19]

Shinohara

[11] Patent Number: 4,490,019
[45] Date of Patent: Dec. 25, 1984

[54] WIDE ANGLE COPYING LENS WITH HIGH APERTURE EFFICIENCY

[75] Inventor: Hiroichi Shinohara, Kanagawa, Japan

[73] Assignee: Ricoh Company, Ltd., Japan

[21] Appl. No.: 436,064

[22] Filed: Oct. 22, 1982

[30] Foreign Application Priority Data

Oct. 23, 1981 [JP] Japan .................... 56-169927

[51] Int. Cl.$^3$ .................................. G02B 9/62
[52] U.S. Cl. ............................. 350/464; 350/474
[58] Field of Search ................. 350/464, 447, 469

[56] References Cited

U.S. PATENT DOCUMENTS 3,922,071  11/1975  Kitagawa et al. ................ 350/454

Primary Examiner—John K. Corbin
Assistant Examiner—Paul M. Dzierzynski
Attorney, Agent, or Firm—Guy W. Shoup

[57] ABSTRACT

A stop is disposed forwardly of the lens system which comprises three individual lenses. A first lens located nearest the stop represents a positive meniscus lens, followed by a second and a third individual lens, both of which represent negative meniscus lenses. Each of the first to the third lens has its concave surface directed toward the stop. A small air gap exists between the second and the first lens. Representing the focal length of the first lens by $f_1$, the composite focal length of the first and the second lens by $f_{1,2}$, the composite focal length of the first to the third lens by $f$, the radius of curvature of a second refractive surface in the lens system by $r_3$, the radius of curvature of a third refractive surface by $r_4$, the refractive index of the first lens by $n_1$, and the Abbe number of the first and the second lens by $\nu_1$, $\nu_2$, respectively, these parameters satisfy the following inequalities.

(1) $5.32 < f/f_1 < 5.52$
(2) $0.9 < f/f_{1,2} < 1.1$
(3) $1.60 < n_1$
(4) $1.02 < r_3/r_4 < 1.05$
(5) $56 \pm n < \nu_1 < 56 \pm 3n$ where n represents an arbitrary real number and $\nu_2 = 41 \pm 0.5n$. A pair of lens systems, each constructed as defined above, are disposed on the opposite side of the stop in a perfectly symmetrical manner, thereby providing a wide angle copying lens with high aperture efficiency including six individual lenses.

3 Claims, 4 Drawing Figures

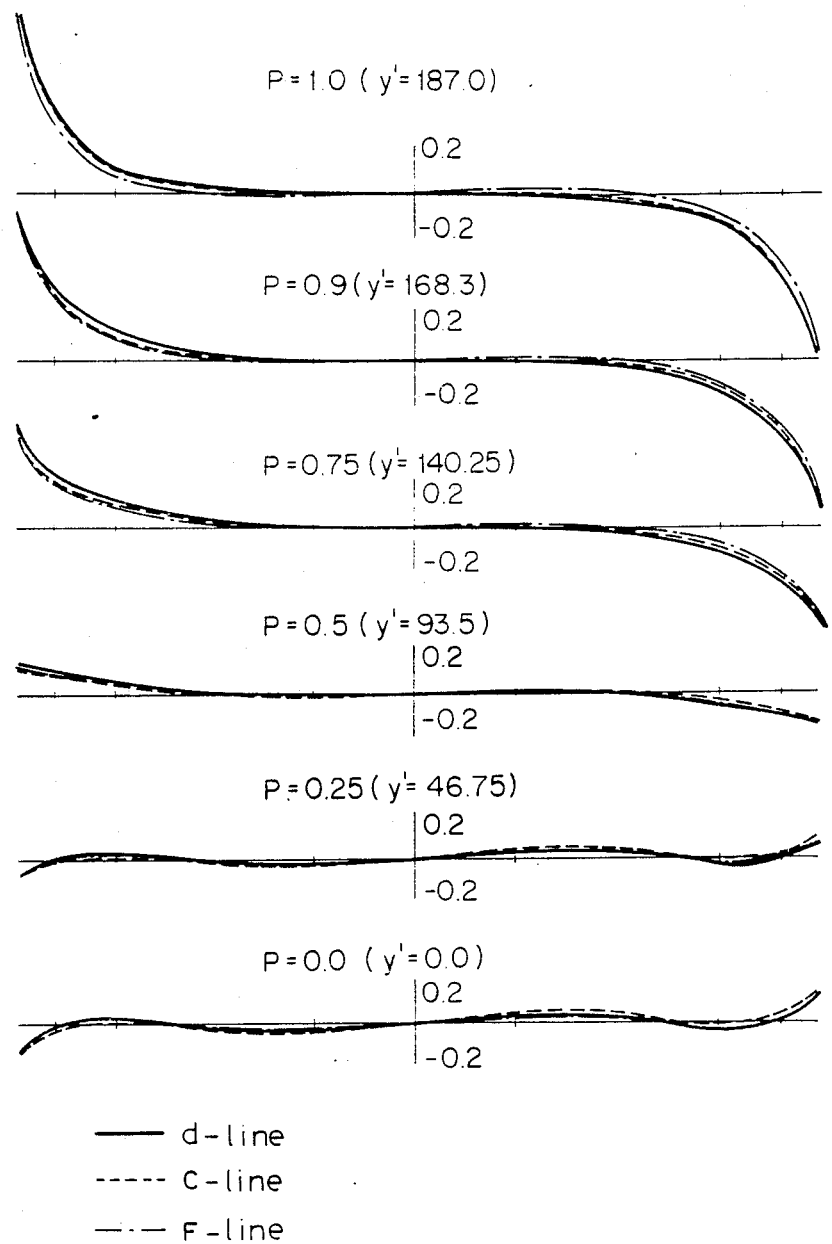

WIDE ANGLE COPYING LENS WITH HIGH APERTURE EFFICIENCY

BACKGROUND OF THE INVENTION

This invention relates to a wide angle copying lens including six individual lenses and having a half angle of view which is as high as 24°, F: 6.0 or less and an aperture efficiency which reaches 100% in the marginal region of the angle view.

The present inventor has previously proposed a compact, wide angle copying lens of a novel type including six individual lenses and having a half angle of view which is as high as 24° (see Japanese Patent Application No. 063,271/1981). While the compact lens has been an epoch-making for the wide angle copying lens, it suffered from a low value of F-number of 6.0 which is less than desirable for practical purpose and an aperture efficiency in the marginal region of the angle of view which is less than 100%.

SUMMARY OF THE INVENTION

It is an object of the invention to provide an improved lens of the type mentioned above, by having a compact, wide angle copying lens having a reduced value of F-number and a favorable aperture efficiency and correction of aberrations.

The wide angle copying lens of the invention has an F-number of 5.6 which is small enough for practical purposes, and an aperture efficiency which maintains 100% up to the half angle of view of 24°. Various aberrations are favorably corrected for light in a wavelength region from 480 to 650 nm and up to the marginal region of the half angle of view of 24°. In addition, the total length of the lens 0.4 times the composite focal length of the entire lens system, which represents a compact version for the lens of this type.

As is well recognized, when a perfectly symmetrical lens is used at or close to a magnification of unity, the distortion, an aberration which results from the non-symmetry, is reduced to zero. Accordingly, a perfectly symmetrical lens is frequently employed as a copying lens which is to operate at or close to a magnification to unity,. Such lens has a light path which is symmetrical with respect to the stop, so that the correction of aberrations can be made by assuming that a lens system located on one side of the stop focuses a point object located at infinity onto a focal plane (see FIG. 1).

The wide angle copying lens of the invention is formed by a pair of such lens systems, each of which includes three individual lenses. The pair of lens systems are constructed in an identical manner and are disposed on the opposite sides of the stop in a perfectly symmetrical manner.

A lens system disposed on one side of the stop comprises a first lens, formed by a positive meniscus lens, having its concave surface directed toward the stop, a second lens, formed by a negative meniscus lens, disposed with a small air gap from the first lens and having its concave surface directed toward the stops, and a third lens, formed by a negative meniscus lens, which is concave with respect to the stop. Thus, the lens system includes three individual lenses. Representing the radius of curvature of a stop surface by $r_1$, and the radii of curvature of sequential refractive surfaces by $r_2 \ldots r_7$, respectively, the separation between the stop and the refractive surface of the first lens having the radius of the curvature $r_2$ by $d_1$ and the separation between sequential refractive surfaces by $d_2 \ldots d_6$, respectively, the refractive indices of lens material and the Abbe number of the first to the third lens by $n_1 \ldots n_3$ and $\nu_1 \ldots \nu_3$, respectively, the focal length of the first lens by $f_1$, the composite focal length of the first and the second lens by $f_{1,2}$, and the composite focal length of the first to the third lens by $f$, the lens system satisfy the following requirements:

(1) $5.32 < f/f_1 < 5.52$
(2) $0.9 < f/f_{1,2} < 1.1$
(3) $1.60 < n_1$
(4) $1.02 < r_3/r_4 < 1.05$
(5) $56 \pm n < \nu_1 < 56 \pm 3n$ when $\nu_2 = 41 \pm 0.5n$ and n is an arbitrary real number.

The wide angle copying lens has a brightness of 5.6, a half angle of view of 24° and an aperture efficiency of 100%, providing a satisfactory performance.

BRIEF DESCRIPTION OF THE DRAWINGS

FIG. 4 graphically show the lateral aberrations of the embodiment.

DESCRIPTION OF INVENTION

The necessity to satisfy the above requirements (1) to (5) will be described below.

The requirements (1) and (2) define the distribution of the strength in the lens system of the invention. It is found that the ratios $f/f_1$ and $f/f_{1,2}$ must be within the ranges defined by these requirements in order to reduce the F-number and to attain a favorable performance up to the half angle of view of 24°. Considering the requirement (1) it will be appreciated that the smaller value is preferred to minimize coma, but when the lower limit is exceeded, there results an excessive spherial aberration on the positive side while when the upper limit is exceeded, the coma will increase and cannot be compensated for by other means.

Considering the requirement (2), the smaller value is preferred to minimize the coma as before. However, when the lower limit is exceeded, the curvature of image field will be excessive in the positive direction and a reduction of the F-number becomes impossible. When the upper limit is exceeded, the spherical aberration will be excessive in the positive direction and coma flare will increase.

Figure 1:
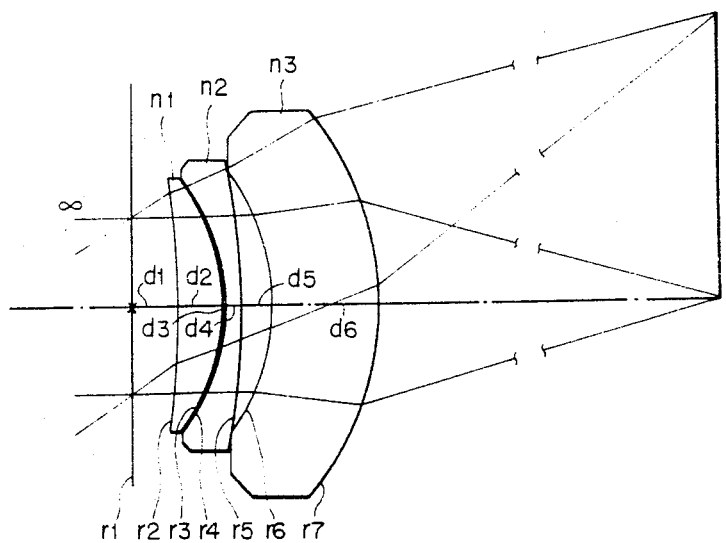
FIG. 1 is an elevational section, through a plane including the optical axis, of a lens system of the perfectly symmetrical lens of the invention which is located on one side of a stop.

In the lens system shown in FIG. 1, if the diameter of the stop is increased in an attempt to reduce the F-number, an oblique ray having an increased height of incidence will be intercepted by the marginal region of the fifth surface $r_5$, preventing an aperture efficiency from being increased. However, if it is attempted to increase the lens separation $d_5$ in order to provide an increased diameter for the fifth surface, the general curvature of the image field will occur in the negative direction while simultaneously increasing coma flares. To correct for this, the first lens has an increased value of refractive index $n_1$, thus bringing the image field back to the positive direction, as defined by the requirement (3). If the lower limit is exceeded, there results an insufficient correction to bring the image field back in the positive direction. The radius of curvature $r_3$ of the third surface will increase, increasing the thickness of the first lens in the marginal region, thus permitting the lens diameter to be increased in order to reduce the F-number.

The requirement (4) is related to the requirement (3). As increased value of $d_5$ causes the image field to be directed toward the negative direction while the spherical aberration is little influenced. However, when a curvature of the image field is corrected by increasing the value of $n_1$ while maintaining a constant strength of the first lens, the spherical aberration will be excessive. Accordingly, the value of $r_4$ is changed as the radius of curvature $r_3$ is changed, thereby correcting the spherical aberration. When the upper limit is exceeded, there results an overcorrection of the spherical aberration while when the lower limit is exceeded, there results an undercorrection of the spherical aberration with concurrent significant increase in the coma.

The requirement (5) relates to the correction of chromatic aberration. When $\nu_1$ to $\nu_3$ are changed, the chromatic aberration is most influenced by a change in the value of $\nu_2$. It is most preferred that the value of $\nu_1$ be on the order of 56 when $\nu_2=41$ for the chromatic aberration of the wavelength region of 650 to 480 nm. When the lower limit is exceeded, the chromatic aberration will shift in the positive direction toward the shorter wavelengths, while it will shift in the negative direction toward the shorter wavelengths when the upper limit is exceeded.

DESCRIPTION OF PREFERRED EMBODIMENT

An embodiment which satisfies the above requirements will now be given below. The nomenclature will be defined below:

$r_1$: the radius of curvature of stop surface $r_2, r_3 \ldots r_7$: radii of curvature of individual refractive surfaces $d_1$: the separation between the stop surface and the first refractive surface $d_2, d_3 \ldots d_6$: the separations between adjacent refractive surfaces in the lens system $n_1, n_2, n_3$: the refractive indices (d-line) of the first, the second and the third lens $\nu_1, \nu_2, \nu_3$: the Abbe number (d-line) of the first, the second and the third lens $f_1$: the focal length of the first lens $f_{1,2}$: the composite focal length of the first and the second lens $f$: the composite focal length of the first to the third lens $R_1, R_2 \ldots R_{13}$: radii of curvature of individual lenses $D_1, D_2 \ldots D_{12}$: separation between individual lens surfaces $N_1, N_2 \ldots N_6$: refractive indices (d-line) of individual lenses $\nu_1, \nu_2 \ldots \nu_6$: the Abbe number (d-line) of individual lenses F: the focal length of the perfectly symmetrical lens M: magnification of the lens W: half angle of view L: total length of the lens

| 1:5.6 | F = 210 mm | M = 1.0 | W = 24° | L = 0.40F |
|---|---|---|---|---|
| $R_1 = 46.15$ | $D_1 = 19.00$ | $N_1 = 1.65844$ | | $\nu_1 = 50.9$ |
| $R_2 = 40.03$ | $D_2 = 4.11$ | | | |
| $R_3 = 88.68$ | $D_3 = 2.31$ | $N_2 = 1.58921$ | | $\nu_2 = 41.1$ |
| $R_4 = 29.34$ | $D_4 = 0.38$ | | | |
| $R_5 = 30.34$ | $D_5 = 8.63$ | $N_3 = 1.61117$ | | $\nu_3 = 55.9$ |
| $R_6 = 156.50$ | $D_6 = 8.03$ | | | |
| $R_7 = \infty$ (stop) | $D_7 = 8.03$ | | | |
| $R_8 = -156.50$ | $D_8 = 8.63$ | $N_4 = 1.61117$ | | $\nu_4 = 55.9$ |
| $R_9 = -30.34$ | $D_9 = 0.38$ | | | |
| $R_{10} = -29.34$ | $D_{10} = 2.31$ | $N_5 = 1.58921$ | | $\nu_5 = 41.1$ |
| $R_{11} = -88.68$ | $D_{11} = 4.11$ | | | |
| $R_{12} = -40.3$ | $D_{12} = 19.00$ | $N_6 = 1.65844$ | | $\nu_6 = 50.9$ |
| $R_{13} = -46.15$ | | | | |

Figure 3:
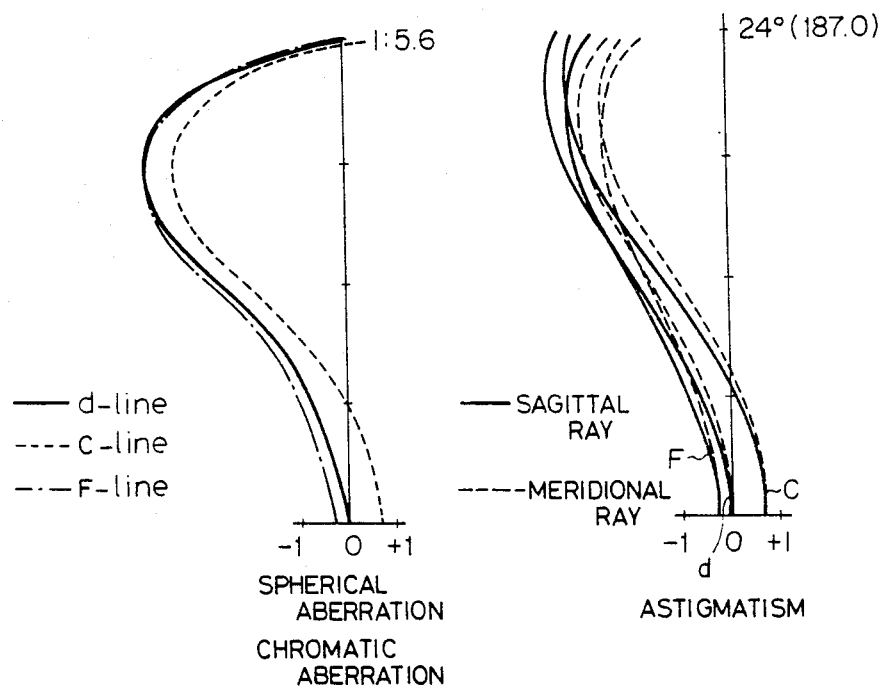
FIG. 3 graphically shows the aberrations of the embodiment shown in FIGS. 1 and 2.

FIG. 3 shows aberration curves at a magnification of unity and when the individual lenses are disposed prefectly symmetrically with respect to the stop, located at the center. The spherical aberration is substantially zero at a maximum height of incidence and thus is normally corrected. It is well balanced with stigmatism, and the axial chromatic aberration is distributed from C-line to F-line so that the image field is well balanced up to the marginal region.

FIG. 4 shows lateral aberration curves wherein P represents an image height ratio and y' an image height. As shown, the coma remains flat despite the aperture efficiency is equal to 100%. The chromatic aberration fairly coincides with the reference ray or d-line, exhibiting a high contrast as to the peripheral region for any wavelength in a range from C-line to F-line.

As described, the lens system of the invention provides a brightness of 5.6, a half angle of view of 24° and an aperture efficiency of 100% while achieving a favorable performance, thus enabling an extended applicability of the wide angle copying lens.

What is claimed is:

1. A wide angle copying lens system with high aperture efficiency including six individual lenses which are disposed in a pair of identical lens systems disposed in a perfectly symmetrical manner with respect to a stop located at the center, whereby the stop is disposed for-

| | | | | |
|---|---|---|---|---|
| $r_1 = \infty$ | $d_1 = 0.024674f$ | | | |
| $r_2 = -0.480878f$ | $d_2 = 0.026517f$ | $f/f_1 = 5.422$ | $n_1 = 1.61117$ | $\nu_1 = 55.9$ |
| $r_3 = -0.093226f$ | $d_3 = 0.001168f$ | | | |
| $r_4 = -0.0901530f$ | $d_4 = 0.007098f$ | $f/f_{1,2} = 0.997$ | $n_1 = 1.58921$ | $\nu_2 = 41.1$ |
| $r_5 = -0.272487f$ | $d_5 = 0.012629f$ | | | |
| $r_6 = -0.123000f$ | $d_6 = 0.058381f$ | $f/f = 1.000$ | $n_3 = 1.65844$ | $\nu_3 = 50.9$ |
| $r_7 = -0.141805f$ | | | | |

Figure 2:
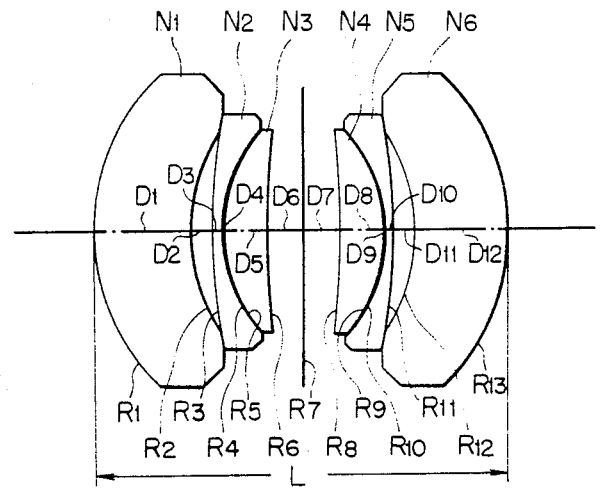
FIG. 2 is an elevational section, through a plane including the optical axis, of the perfectly symmetrical lens according to one embodiment of the invention.

In practical use, a pair of lens systems as described above are disposed in a perfectly symmetrical manner with respect to the stop to produce a six-lens arrangement as shown in FIG. 2.

An embodiment in which F: 5.6 and f=210 mm are employed is given below. Nomenclature is defined below.

wardly of each of the lens systems, each of the lens systems comprising: a first lens, formed by a positive meniscus lens, having its concave surface directed toward the stop; a second lens formed by a negative meniscus lens, disposed at a small air gap from the first lens and having its concave surface directed toward the stop; and a third lens, formed by a negative meniscus lens, having its concave surface directed toward the stop, the wide angle copying lens system satisfying the following requirements:

$5.32 < f/f_1 < 5.52$
$0.9 < f/f_{1,2} < 1.1$
$1.60 < n_1$
$1.02 < r_3/r_4 < 1.05$ $56 \pm n < \nu_1 < 56 \pm 3n$, when $\nu_2 = 41 \pm 0.5n$, where n represents an arbitrary real number,
where $n_1$ represents the refractive index of the first lens and $\nu_1$ to $\nu_3$ the Abbe number of each of lens materials, $f_1$ the focal length of the first lens, $f_{1,2}$ the composite focal length of the first and the second lens, and f the composite focal length of the first to the third lens.

2. A wide angle copying lens with high aperture efficiency according to claim 1 wherein the parameters have values given below

| | | | | |
|---|---|---|---|---|
| $r_1 = \infty$ | $d_1 = 0.024674f$ | | | |
| $r_2 = -0.480878f$ | $d_2 = 0.026517f$ | $f/f_1 = 5.422$ | $n_1 = 1.61117$ | $\nu_1 = 55.9$ |
| $r_3 = -0.093226f$ | $d_3 = 0.001168f$ | | | |
| $r_4 = -0.0901530f$ | $d_4 = 0.007098f$ | $f/f_{1,2} = 0.997$ | $n_2 = 1.58921$ | $\nu_2 = 41.1$ |
| $r_5 = -0.272487f$ | $d_5 = 0.012629f$ | | | |
| $r_6 = -0.123000f$ | $d_6 = 0.058381f$ | $f/f = 1.000$ | $n_3 = 1.65844$ | $\nu_3 = 50.9$ |
| $r_7 = -0.141805f$ | | | | | where
- $r_1$: the radius of curvature of stop surface,
- $r_2, r_3 \ldots r_7$: radii of curvature of individual refractive surfaces,
- $d_1$: the separation between the stop surface and the first refractive surface,
- $d_2, d_3 \ldots d_6$: the separation between adjacent refractive surfaces in the lens system,
- $n_1, n_2, n_3$: the refractive indices (d-line) of the first, the second and the third lens,
- $\nu_1, \nu_2, \nu_3$: the Abbe number (d-line) of the first, the second and the third lens,
- $f_1$: the focal length of the first lens,
- $f_{1,2}$: the focal length of the first and the second lens,
- f: the composite focal length of the first to the third lens.

3. A wide angle copying lens with high aperture efficiency according to claim 2 wherein f:5.6 and f = 210 mm and the parameters are specified as given below:

| 1:5.6  F = 210 mm  M = 1.0  W = 24°  L = 0.40F | | | |
|---|---|---|---|
| $R_1 = 46.15$ | $D_1 = 19.00$ | $N_1 = 1.65844$ | $\nu_1 = 50.9$ |
| $R_2 = 40.03$ | $D_2 = 4.11$ | | |
| $R_3 = 88.68$ | $D_3 = 2.31$ | $N_2 = 1.58921$ | $\nu_2 = 41.1$ |
| $R_4 = 29.34$ | $D_4 = 0.38$ | | |
| $R_5 = 30.34$ | $D_5 = 8.63$ | $N_3 = 1.61117$ | $\nu_3 = 55.9$ |
| $R_6 = 156.50$ | $D_6 = 8.03$ | | |
| $R_7 = \infty$ (stop) | $D_7 = 8.03$ | | |
| $R_8 = -156.50$ | $D_8 = 8.63$ | $N_4 = 1.61117$ | $\nu_4 = 55.9$ |
| $R_9 = -30.34$ | $D_9 = 0.38$ | | |
| $R_{10} = -29.34$ | $D_{10} = 2.31$ | $N_5 = 1.58921$ | $\nu_5 = 41.1$ |
| $R_{11} = -88.68$ | $D_{11} = 4.11$ | | |
| $R_{12} = -40.03$ | $D_{12} = 19.00$ | $N_6 = 1.65844$ | $\nu_6 = 50.9$ |
| $R_{13} = -46.15$ | | | | where
- $R_1, R_2 \ldots R_{13}$: radii of curvature of the individual refractive surfaces
- $D_1, D_2 \ldots D_{12}$: separation between individual lens surfaces,
- $N_1, N_2 \ldots N_6$: refractive indices (d-line) of individual lenses,
- $\nu_1, \nu_2 \ldots \nu_6$: the Abbe number (d-line) of individual lenses,
- F: the focal length of the wide angle copying lens system,
- M: magnification of the lens system,
- W: half angle of view, and
- L: total length of the lens system.

* * * * *